United States Patent

[11] 3,562,450

[72] Inventor Howard L. Rosen
Star Rt. 159, Buckingham, Va. 23921

[21] Appl No 675,618
[22] Filed Oct. 16, 1967
[45] Patented Feb. 9, 1971

[54] NOISE SOURCE LOCATOR
2 Claims, 4 Drawing Figs.

[52] U.S. Cl. .................................................. 179/175.3
[51] Int. Cl. .................................................. H04b 3/46
[50] Field of Search .................................................. 179/175, 175.1, 175.11, 175.2, 175.2c, 175.25, 175.3

[56] References Cited

UNITED STATES PATENTS

| | | | |
|---|---|---|---|
| 653,422 | 7/1900 | Ludington | 179/175.1 |
| 861,357 | 7/1907 | Buttler | 179/175.3 |

*Primary Examiner*—Kathleen H. Claffy
*Assistant Examiner*—David L. Stewart
*Attorney*—Strauch, Nolan, Neale, Nies & Kurz

ABSTRACT: A device to be connected in series with a communication system line carrying signals, such as a telephone line, to permit rapid detection of the location of the source of unwanted noise on the line.

PATENTED FEB 9 1971 3,562,450

INVENTOR
Howard L. Rosen by Strauch, Nolan, Neale, Nies & Kurz
ATTORNEYS

NOISE SOURCE LOCATOR

BACKGROUND OF INVENTION

An important requisite of voice transmission by wire is clarity of signal. Companies providing telephone services are faced with frequent complaints of background noise or static on the telephone lines. Such noise is invariably caused by a defect in the line such as a partial ground or open which can occur at any point in a line which may be several miles long. The fault can occur in the main cable or in the line which leads from the main cable to the individual subscriber.

The problem of locating a fault is complicated by the circumstance that maintenance of the main cable and maintenance of the branch lines are under the jurisdiction of different maintenance crews. Accordingly, it is necessary first to determine whether the fault is in the main cable or the individual branch line. After this is determined, the appropriate crew is assigned the task of repairing the line or cable.

At present there is no known reliable method of locating a fault in the system or for determining whether the fault is in the main cable or the individual branch line. Often, if an inspection of the obvious sources of possible trouble does not reveal the fault, the objectionable condition may remain uncorrected. Present inspection and repair techniques also require that the line be put out of service for an indefinite period which results in further inconvenience to the individual subscribers. The overall result is either continuous dissatisfaction and annoyance or maintenance costs which are prohibitively high.

SUMMARY OF THE INVENTION

With these considerations in mind it is a principal purpose and object of the present invention to provide a simple inexpensive unit which permits the quick and easy location of a fault in a telephone line or like communication system signal carrier which is usable without special skills or tools and which provides, under all circumstances, a positive audible indication of the location of the source of the noise on a line.

In attaining these and other objects, the present invention provides a device which, when connected in series with a telephone or like communication system line, permits the operator to listen to the portion of the line extending in one direction away from the device while blocking signals from the remainder of the line thus permitting rapid location of the noise source in the line. The device comprises a unit which is connected in series with a telephone line and which includes a headset and internal circuits controlled by external switches to permit the operator to listen selectively to the portion of the line at one side of the unit or to the other side of the unit or to connect the line through the unit to permit normal use of the line to minimize the interruption of normal service.

It is a further object of the present invention to provide a noise source locator device for telephone or like communication system line which may be used without changing the characteristics of the line in which it is installed and which thus permits the prompt and ready location of trouble spots which, with presently available apparatus, escape detection.

It is an additional object of the present invention to provide a relatively uncomplicated noise source locator unit for a communication circuit which is of compact lightweight construction and which can be conveniently carried by a repairman and which thus permits the repairman to work without assistance even in remote locations or locations where access is unusually difficult.

It is an additional object of the present invention to provide a novel noise source locator unit for a communication circuit which is unusually resistant to damage and has an unusually long trouble-free service life.

Additional objects and advantages of the present invention will become apparent as the description proceeds in connection with the accompanying drawings.

DESCRIPTION OF PREFERRED EMBODIMENTS

Figures 1, 2, 3, 4:
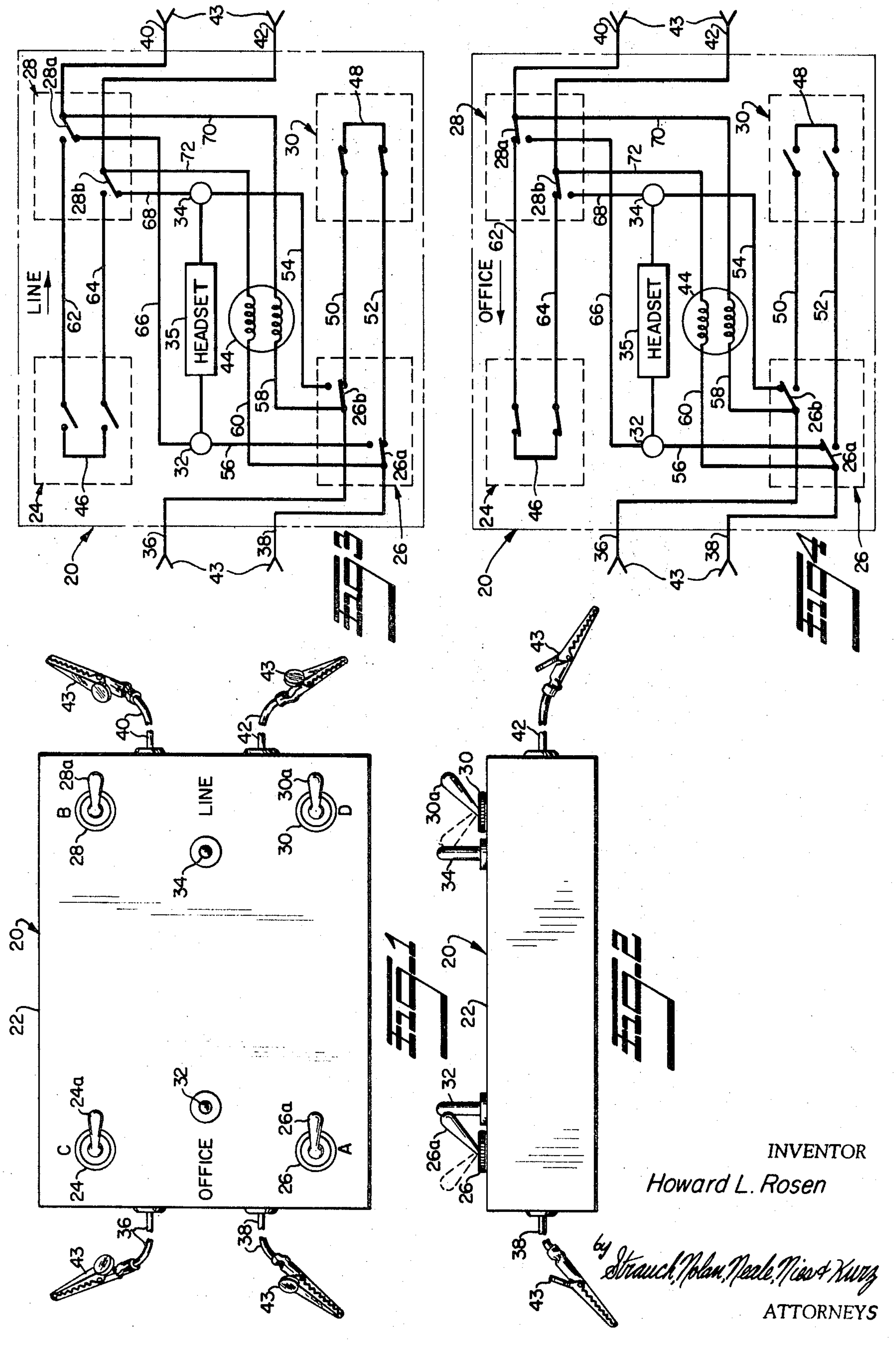
FIG. 1 is a semidiagrammatic top plan view of a noise source locator constructed in accordance with the present invention.
FIG. 2 is a side elevation of the unit of FIG. 1.
FIGS. 3 and 4 are circuit diagrams illustrating schematically the internal construction of the unit of FIG. 1 showing the operator controlled switches in two different test positions.

With more specific reference to the drawings, the noise source locator unit of the present invention, indicated generally at 20, is contained in a lightweight insulated weatherproof housing 22 preferably formed of a suitable plastic. In practice the unit may be relatively small, for example, 6 inches long, 4 inches wide and 2 inches high. Mounted on the top face of the unit are four toggle switches 24, 26, 28 and 30, respectively, which are so oriented that the switch toggle operating members **24*a*, 26*a*, 28*a*, and 30*a*** are movable in planes parallel to the longitudinal axis of the unit.

Also mounted on the top panel of the container 22 are a pair of terminals 32 and 34 which provide points of connection for a conventional headset 35 (FIGS. 3 and 4). Details of the headset have been omitted from the drawings since it is in all respects conventional.

Extending from the opposite ends of the housing 22 are pairs of line connectors 36 and 38 and 40 to 42, the terminal ends of which are equipped with conventional clips 43 to facilitate their rapid connection to the telephone lines.

To facilitate the use of the unit, one end of the box may carry a label such as "office" and the opposite end may carry a label such as "line." As will more fully appear below the unit in use is connected in series with a telephone line with the end marked "office" physically oriented toward the main telephone office and the end marked "line" physically oriented toward the individual subscriber. By proper manipulation of the switches 24—30, a headset attached to the terminals 32 and 34 may be placed in communication with the portion of the line or cable between the unit and the telephone office or, alternately, the portion of the line or cable between the unit and the subscriber.

Referring now more particularly to FIGS. 3 and 4 the unit includes, in addition to the switches and leads described above, a coil 44. While the characteristics of the coil do not appear to be critical, excellent results have been achieved with an 88 milli-Henry loading coil of the type conventionally used on telephone lines at intervals of approximately 6,000 feet to improve the characteristics of the system.

The switch assemblies 24 and 30 are of identical construction, each being a double-pole single-throw switch adapted, when closed, to complete a circuit across a shunt bar 46 or 48. The switches 26 and 28 are also identical and they each are of double-pole double-throw construction.

The switch blades **26*a* and 26*b* are adapted, when moved to the position of FIG. 3, to connect the leads 36 and 38 to the shunt 48 through leads 50 and 52 or, when moved to the position of FIG. 4, to connect the leads 36 and 38 to the headset terminals 34 and 32 through leads 54 and 56, respectively. Regardless of the position of the switch 26 the leads 36 are connected in parallel with the coil 44 through leads 58 and 60, respectively. Similarly, the blades 28*a* and 28*b* of switch 28 are adapted, when moved to the position of FIG. 4, to connect the external leads 40 and 42 to the shunt bar 46 through leads 62 and 64 or, when moved to the position of FIG. 3, to open the shunt circuit and connect the leads 40 and 42 to the terminals 32 and 34 through leads 66 and 68, respectively. Regardless of the position of the switches, the leads 40 and 42 are always connected to the coil 44 by leads 70 and 72**.

When a complaint is received from a subscriber, the noise source locator unit of the present invention is first employed to determine whether the source of the noise is in the main cable or in the individual line serving the subscriber. To make this determination, the unit is installed in series with the subscriber's line at the junction between the line and the main cable. The leads 36 and 38 are connected to the cable and the leads 40 and 42 are connected to the subscriber's line. The switches 24—30 are then moved to the FIG. 3 position which enables the repairman to listen through the headset to the entire line extending between its connection to the main cable and the subscriber's phone since the leads 40 and 42 are connected to the headset terminals through the leads 66 and 68. Since the leads 36 and 38 are effectively shorted out through the shunt bar 48 the headset is isolated from the cable.

If the repairman hears the noise complained of he will know immediately that the fault exists in the line between the main cable and the subscriber's telephone. It will be noted that during this check the toggles 26*a*—30*a* are physically oriented toward the subscriber end of the telephone line providing a ready visual check of the direction from which the noise is coming. If the repairman does not hear the noise complained of he will know that the fault exists in the main cable. This can be readily checked by reversing all of the switches to connect the headset to the cable while isolating it from the line. After it has been determined that the source of difficulty is in the line or the cable, the appropriate maintenance crew is assigned the task of repair.

Assuming that the preliminary check indicates difficulty in the individual subscriber line, this line is opened at a random location, usually its midpoint, the unit is installed in series with the line with the leads 40 and 42 again oriented toward the subscriber end of the line and the leads 36 and 38 oriented toward the main telephone office. The switches then are disposed in the FIG. 3 position to enable the repairman to listen only to the portion of the line between the test point and the subscriber end of the line or in the FIG. 4 position to enable the repairman to listen only to the portion of the line between the test point and the main telephone office.

In either case the repairman will immediately know which portion of the line contains the fault. Generally, the repairman will verify his determination by reversing the switches.

The test unit is then removed from the line, the line is closed and the test unit is then installed at a random location, usually the midpoint, of the portion of the line which, in the previous test, has been determined to contain the noise source. This procedure is repeated until the precise location of the trouble is located.

In practice it has been found that two or three tests are usually sufficient to pinpoint the source of the noise since once a relatively short portion of line is determined to contain the noise source, the cause of the fault can be determined by visual inspection.

It is to be particularly noted that the interruption of normal service is minimized since the individual tests may be performed in a matter of a very few minutes. Normal service can be restored even when the test unit is in the line by moving the switches 24 and 28 to the FIG. 3 position and the switches 26 and 30 to the FIG. 4 position and the switches 26 and 30 to the FIG. 4 position thus directly connecting the leads 36 and 38 to the leads 40 and 42, respectively, while opening the circuits across the shunt bars 46 and 48.

The invention may be embodied in other specific forms without departing from the spirit or essential characteristics thereof. The present embodiment is therefore to be considered in all respects a s illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

I claim:

1. Apparatus for locating a source of noise in an operative communication line comprising a listening device, an inductance unit, first and second pairs of independent leads adapted for connection to said communication line in series with said line at a selected test point, means connecting one lead of each pair to one lead of the other pair through said inductance unit, means connecting the other lead of each pair to the other lead of the other pair through said inductance unit, and switch means in series with said leads and in parallel with said inductance unit and said listening device, said switch means being operable in a first position to connect one pair of said leads to said listening device and simultaneously disconnect the other pair of leads from said listening device and operable in a second position to connect said other pair of leads to said listening device and to disconnect said one pair of leads from said listening device, said switch means being operable in a third position to connect each of said leads to said listening device.

2. The apparatus according to claim 1 wherein said switch means are toggle switches so oriented that in said first position they point toward said one pair of leads and in said second position they point toward said other pair of leads to provide a visual indication of the pair of leads to which said listening device is connected.